UNITED STATES PATENT OFFICE.

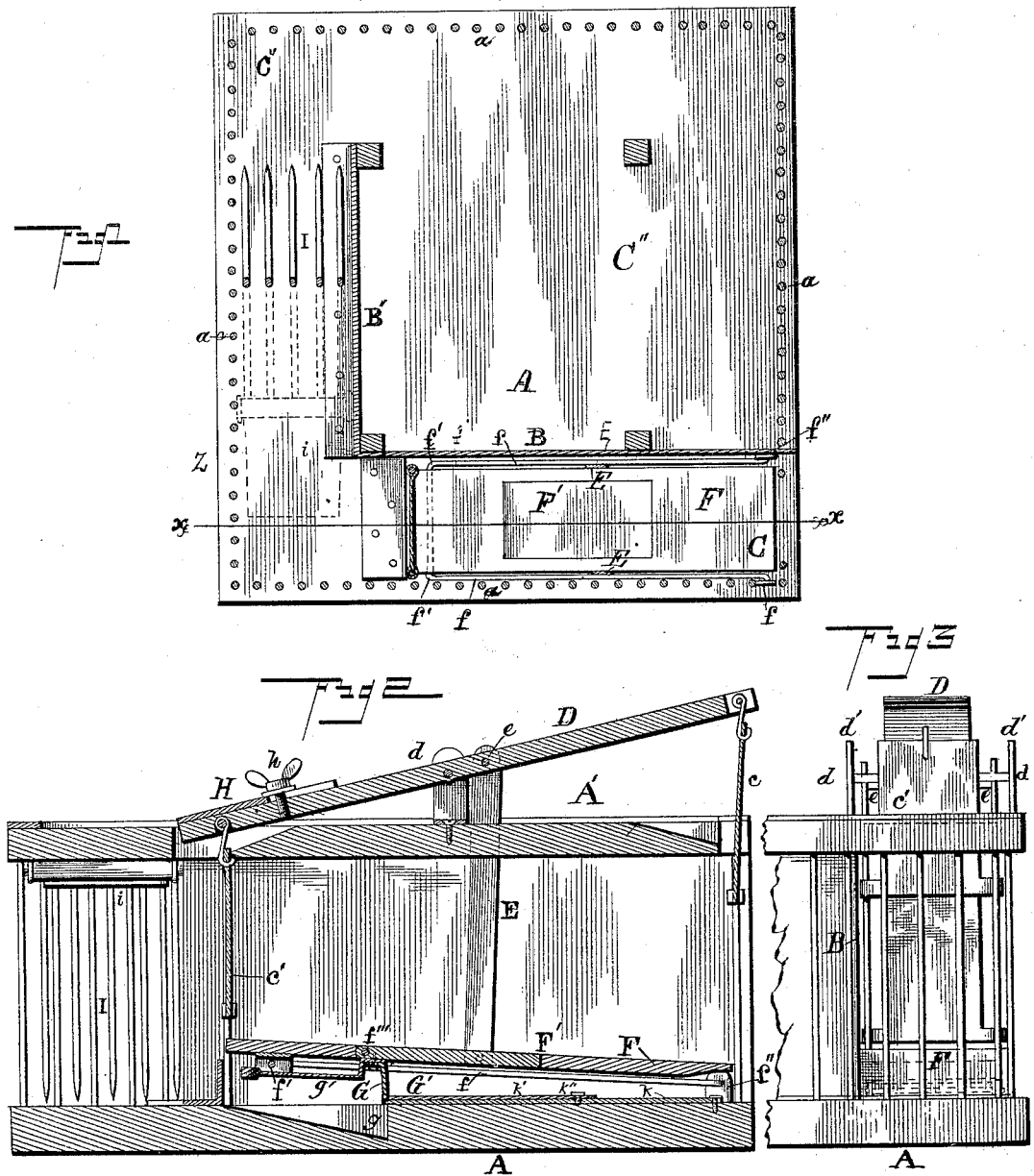

CHARLES WASHINGTON SMITH, OF PELZER, SOUTH CAROLINA, ASSIGNOR OF ONE-HALF TO ALFRED B. CARPENTER, OF SAME PLACE.

ANIMAL-TRAP.

SPECIFICATION forming part of Letters Patent No. 431,856, dated July 8, 1890.

Application filed April 10, 1890. Serial No. 347,347. (Model.)

*To all whom it may concern:*

Be it known that I, CHARLES WASHINGTON SMITH, a citizen of the United States, residing at Pelzer, in the county of Anderson and State of South Carolina, have invented certain new and useful Improvements in Animal-Traps; and I do hereby declare the following to be a full, clear, and exact description of the invention, such as will enable others skilled in the art to which it appertains to make and use the same.

This invention relates to certain improvements in animal-traps, which will be hereinafter more particularly described and pointed out.

In the accompanying drawings, forming part of this specification, Figure 1 is a plan view of the interior of a trap with my improvements therein. Fig. 2 is a vertical section on line $x\,x$ of Fig. 1; and Fig. 3 is a vertical elevation of one corner, as shown at $z$, Fig. 1.

A is the bottom board, and A' is the top board, of the trap, which may be of any convenient dimensions and form.

$a\,a$, &c., are wires for small game and iron rods of any size to suit larger animals, as this trap may be used for the largest forest animals that are usually trapped.

B B' is a closed partition of metal, which is L-shaped and forms a passage-way from the corner C around two sides of the trap to the diagonal corner C' and into the main chamber C''. The entrance at C is closed by a sliding door $c$, which is suspended to a lever D. At the other end of lever D is suspended a sliding door $c'$, which will drop and close the first passage whenever the door $c$ is raised. The lever D is pivoted to the standards $d\,d$, which are secured on the top board B. On each side of lever D there is a connecting bar or rod E, pivoted at $e$ to the lever D, and at its bottom end pivoted to the sides of a platform F, which platform is supported by the rods E near the middle line between the ends. The outer end of the platform F is free. Near the opposite end spring-rods $f$ are pivoted at $f'$ to the platform, and the other ends of the rods are pivoted to standards $f''$ on the frame or bottom board A. Near the middle of the platform F is a small trap F', pivoted at $f'''$ to the platform, and having at that end of it a trigger G, which rests on a plate G', secured to the bottom board. At the end of the plate G' there is a recess $g$ in the bottom. A counter-weight $g'$ extends beneath the platform F and is arranged so as to evenly balance the trap F and keep it flush with the platform when the trigger G is resting on plate G'; but when the weight of any animal is on it it will settle within its recess, so as to permit the trigger G to be released from the plate G' and impend over the recess $g$, into which it will drop. Then the weight of the animal will cause the whole platform to descend, when the bars or straps E will pull down the lever D at the outer end, and the door $c$ suspended to it will close the opening behind the animal and the inner door will be raised. The platform will remain down so long as the weight is upon it; but so soon as the animal passes through the door $c'$ the platform will rise, the door $c$ will be carried up, and the other door $c'$ will be lowered. On top of the lever D, at the inner end, is a slide H, which has a thumb-screw $h$, which slide and screw are to regulate the weight of that end of the lever, so that the doors can be evenly balanced for working exactly as required. This counter-weight is also for the purpose of relieving that end of so much weight as to cause the outer end with door $c$ to remain down after the animal has passed in to prevent any other animal from entering, so as to protect small game from being destroyed by larger ones, when it is desirable to preserve the game caught by the trap. In the second passage beyond the platform is a self-acting sloping gate I, made of sharp-pointed wires with a counter-weight $i$, (shown in broken lines in Fig. 1,) so that the points of the gate will easily open when a light animal should run against it and yet be self-closing by its own gravity.

The plate G' (shown in section, Fig. 2) is composed of two parts. The lower part $k$ is secured to the bottom board A, and the upper part $k'$ has in it a slot and set-screw $k''$, whereby the seat at the end at the recess $g$ can be regulated for the reception of the counterweighted trigger G.

I claim—

1. In an animal-trap, the platform F, suspended near its middle by straps or rods from the overhead lever and pivoted at one end to side spring-rods, which are secured at their outer ends to the frame of the trap, having in it a pivoted trap-door supplied underneath with a counterweighted trigger.

2. In an animal-trap, the combination of the platform having in it a counterweighted trap-door, the suspension-rods attached to the platform and to the lever, and the lever pivoted on the top of the trap and having a door suspended at each end.

3. The platform of an animal-trap having a pivoted and counterweighted trap-door within it, and supplied with the counterweighted trigger, and supported by suspension-rods from an overhead lever and pivoted to the side springs, and the plate on the bottom board, all constructed substantially as described.

In testimony whereof I affix my signature in presence of two witnesses.

CHARLES WASHINGTON SMITH.

Witnesses:
W. H. AUSTIN,
D. S. ERGLES.